(12) United States Patent
Apte et al.

(10) Patent No.: US 8,688,501 B2
(45) Date of Patent: Apr. 1, 2014

(54) METHOD AND SYSTEM ENABLING DYNAMIC COMPOSITION OF HETEROGENOUS RISK MODELS

(75) Inventors: Chidanand V. Apte, Yorktown Heights, NY (US); Eric W. Cope, Rueschlikon (CH); Lea A. Deleris, Yorktown Heights, NY (US); Shubir Kapoor, Yorktown Heights, NY (US); Kevin P. McAuliffe, Hawthorne, NY (US); Bonnie K. Ray, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 617 days.

(21) Appl. No.: 12/690,358

(22) Filed: Jan. 20, 2010

(65) Prior Publication Data
US 2011/0178949 A1 Jul. 21, 2011

(51) Int. Cl.
*G06Q 10/00* (2012.01)
*G06Q 10/06* (2012.01)
(52) U.S. Cl.
CPC .................... *G06Q 10/0635* (2013.01)
USPC ........................................................ 705/7.28
(58) Field of Classification Search
None
See application file for complete search history.

(56) References Cited

U.S. PATENT DOCUMENTS

| | | | |
|---|---|---|---|
| 6,223,143 B1 * | 4/2001 | Weinstock et al. | 703/17 |
| 7,130,779 B2 * | 10/2006 | Beverina et al. | 703/6 |
| 7,778,856 B2 * | 8/2010 | Reynolds et al. | 705/7.28 |
| 8,132,153 B2 * | 3/2012 | Subramanyam | 717/121 |
| 2002/0184133 A1 * | 12/2002 | Zangari et al. | 705/36 |
| 2003/0101122 A1 * | 5/2003 | Merkoulovitch et al. | 705/36 |
| 2003/0149657 A1 * | 8/2003 | Reynolds et al. | 705/38 |
| 2004/0138933 A1 * | 7/2004 | LaComb et al. | 705/7 |
| 2004/0199445 A1 * | 10/2004 | Eder | 705/35 |
| 2004/0225549 A1 * | 11/2004 | Parker et al. | 705/8 |
| 2005/0065754 A1 * | 3/2005 | Schaf et al. | 702/188 |
| 2006/0100958 A1 * | 5/2006 | Cheng et al. | 705/38 |
| 2007/0239496 A1 * | 10/2007 | Supatgiat et al. | 705/7 |
| 2008/0183521 A1 * | 7/2008 | Parker et al. | 705/7 |
| 2008/0215401 A1 * | 9/2008 | Cheng et al. | 705/7 |
| 2008/0262981 A1 * | 10/2008 | Supatgiat et al. | 705/500 |
| 2009/0030751 A1 * | 1/2009 | Barve et al. | 705/7 |

OTHER PUBLICATIONS

Cornalba, Chiara; Giudici, Paolo. "Statistical Models for Operational Risk Management". 2004. Physics A. Issue 338. pp. 166-172.*
Cheng, F., et al., "IBM Research Report: Modeling Operational Risks in Business Processes", Jul. 20, 2005.

* cited by examiner

*Primary Examiner* — Brett Feeney
(74) *Attorney, Agent, or Firm* — Scully, Scott, Murphy & Presser, P.C.; Daniel P. Morris, Esq.

(57) ABSTRACT

A method and system for quantifying risk by composing a heterogeneous risk model are provided. The method comprises providing risk input data associated with one or more risk nodes to a processor, running one or more risk models to output individual risk quantifications for each risk node, and aggregating the individual risk quantifications into a single output. The system comprises a processor operable to provide risk input data associated with one or more risk nodes to a processor, run one or more risk models to output individual risk quantifications for each risk node and aggregate the individual risk quantifications into a single output.

21 Claims, 5 Drawing Sheets

| Model Name | Description | Industry | Execution Speed | ... | Geo |
|---|---|---|---|---|---|
| BSCRAM | Supply Chain risk adjusted performance model | General | Minutes | | Global |
| ModelWEQ1 | Assesses distribution of web experience quality | General | Seconds | | Global |
| ModelWEQ2 | Assesses distribution of web experience quality | Insurance | Hours | | Global |
| ModelCDFM | Claim processing distribution fitting model | Insurance | Seconds | | Global |
| IndiaHR | HR recruitment risk adjusted performance model | General | Minutes | | India |
| ORQ | Operational risk quantification | Banking | Hours | | Global |
| Fraud severity model | Assess extent of losses following internal fraud | General | Minutes | | United States |
| PBIM | Evaluates the effect of a pandemic on business performance | General | Hours | | United States |
| Natural Hazard model | Evaluates frequency and severity of natural hazards (EQ, Hurricane) | | | | |
| COBRA | Brand and reputation risk model | | | | |
| IT Availability model | Assesses availability of services supported by IT system based on IT data | | | | |

FIG. 4

METHOD AND SYSTEM ENABLING DYNAMIC COMPOSITION OF HETEROGENOUS RISK MODELS

BACKGROUND

The present invention relates generally to risk management and, particularly to a method and system that dynamically composes heterogeneous analytical risk models.

Organizations are increasingly interested in robust systems for assessing and managing risk in general and operational risk in particular. The growing interest in operational risk management has been driven by a variety of factors, including the introduction of regulations requiring businesses to quantify and manage operational risk, such as the New Basel Capital Accord, known as Basel II (see "The New Basel Capital Accord", Bank for International Settlements, April 2003). In most cases, risk is evaluated based on a risk model that seeks to quantify the variability of the risk measure. Risk models are generally specific to a line of business or a risk type, and classified as data-based or opinion based. Such risk models include models based on historical data (statistical models) and models based on expert opinion (for parameter values). Sometimes models are deterministic (i.e., represented by an analytical formula) but with probabilistic inputs making the output probabilistic as well. The usefulness of the statistical approach is limited by the availability of input data on risk events. The expert-oriented approach is limited by the reliability of the experts answers. Both types of models can be computationally intensive. In addition, individual risk models are often not broad enough to support enterprise wide risk management. One solution is to compose risk models to obtain an enterprise level risk assessment. However, the diversity and complexity of risk models makes this task challenging. In particular, models are often designed with a local objective in mind, and may lack the specification of their input and output parameters along with the context in which they were designed and their computational requirements.

Modern organizations are dynamic communities exposed to risks that change on a constant basis. Current risk models are static and only capable of modeling a portion of an organization's risk at a present point in time, but are of limited use in modeling an organization's future risk exposure. Further, risk models are not centrally managed. Therefore, the outputs of heterogeneous risk models cannot easily be combined, nor are the inputs to each risk model easily updated with the most currently available information. The lack of a modular approach to risk management and a lack of centralized management of risk models limits the reuse of individual models for modeling future risk. In particular, re-using individual models (for instance weather models), as part of a larger model (for instance manufacturing risk which would include a weather model) is challenging and often, risk analysts re-build models from the ground up rather than leveraging the time and expertise which has been invested in existing models.

A system and method that enables risk quantification using dynamic composition of heterogeneous risk models is desirable. It is further desirable that the method and system centrally manages the risk models and updates each risk model with the most currently available information.

SUMMARY

A method and system for quantifying risk by composing an aggregate risk model is provided. The aggregate risk model is composed from a combination of heterogeneous risk models. The relationship among the variables of the aggregate risk model can be represented by a probabilistic graphical model. In one embodiment, the probabilistic graphical model, or risk network, is represent by a Bayesian Belief Network. In a Bayesian Belief Network, each variable or risk node, can be associated with one or more risk models. Risk models may be heterogeneous in their inputs and outputs, the mathematical approach that they use, in their computer time requirements, and in their data currency requirements among others. The composition thus takes place at two levels: (1) at the variable or risk node level, when several models are available and (2) at the aggregate model level, when all risk nodes are combined to quantify the aggregate risk.

In one embodiment, the method comprises providing risk input data associated with one or more risk nodes to a processor, running one or more risk models to output individual risk quantifications for each risk node, and aggregating the individual risk quantifications into a single output. When all risk nodes are processed, their individual outputs can be aggregated together, according to a rule such as Bayes rule, to compose an aggregate risk model. The aggregation step may also be performed through simulation heuristics.

A system for quantifying risk by composing heterogeneous risk models, in one aspect, may comprise a processor operable to provide risk input data associated with one or more risk nodes to a processor, run one or more risk models to output individual risk quantifications for each risk node and aggregate the individual risk quantifications into a single output.

A program storage device readable by a machine, tangibly embodying a program of instructions executable by the machine to perform above-method steps for quantifying risk by composing a heterogeneous risk model is also provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 4 is an example of a library of risk models;

DETAILED DESCRIPTION

A method and system that quantifies risk by composing heterogeneous risk models, for example, by aggregating probabilistic distribution output of several different risk models. The following description applies the method and system of the present disclosure in the context of a customer satisfaction analysis as an example. It should be understood, however, that the method and system of the present disclosure could be applied to any other organizational risk quantification.

In one embodiment, the method and system centrally manages risk models by building a probabilistic risk network with risk nodes mapped to one or more of the individual risk models. A library of risk models is created, and invocation parameters (i.e., inputs) for each risk model are defined. Invocation of a particular risk model only occurs when the risk input data matches an invocation parameter. This approach allows different risk models to be deployed on an organization wide basis.

In another embodiment, the method composes heterogeneous risk models together by aggregating the probabilistic distribution of those risk models according to a set of rules or mathematical formulas, such as Bayes rules. For example, a customer satisfaction risk model may be quantified from the combination of a time to process claims model and a web experience quality model.

In another embodiment, an architecture is provided for deploying the method and system of the present invention on an organization wide basis. The architecture supports development of a probabilistic risk network and quantification of risk through the composition of heterogeneous risk models. In one embodiment, a processor matches risk inputs with one or more suitable risk models selected from a risk library. The processor also aggregates the outputs of the various selected risk models in accordance with a set of aggregation rules.

Figure 1:
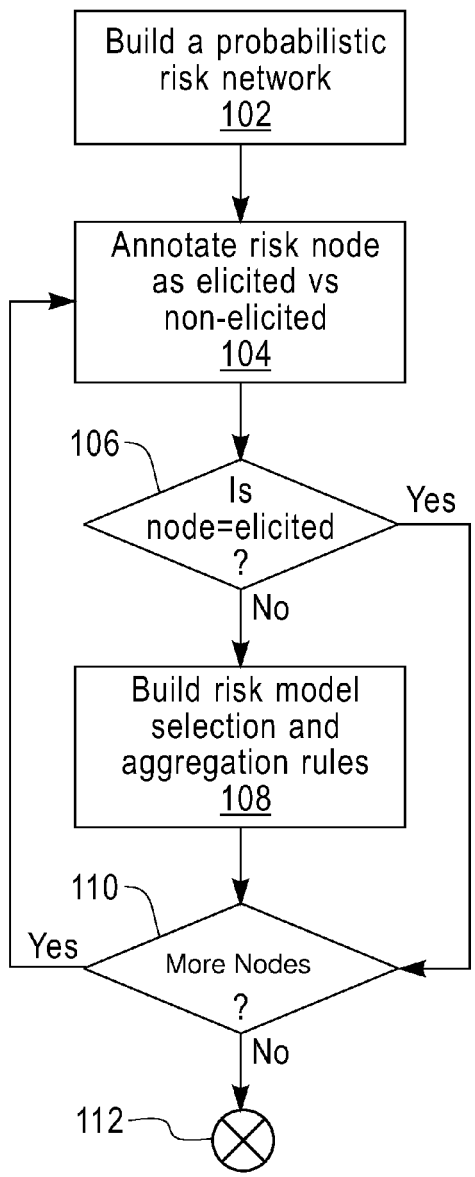
FIG. 1 is a flow diagram illustrating a method for building a probabilistic risk network.
Figure 5:
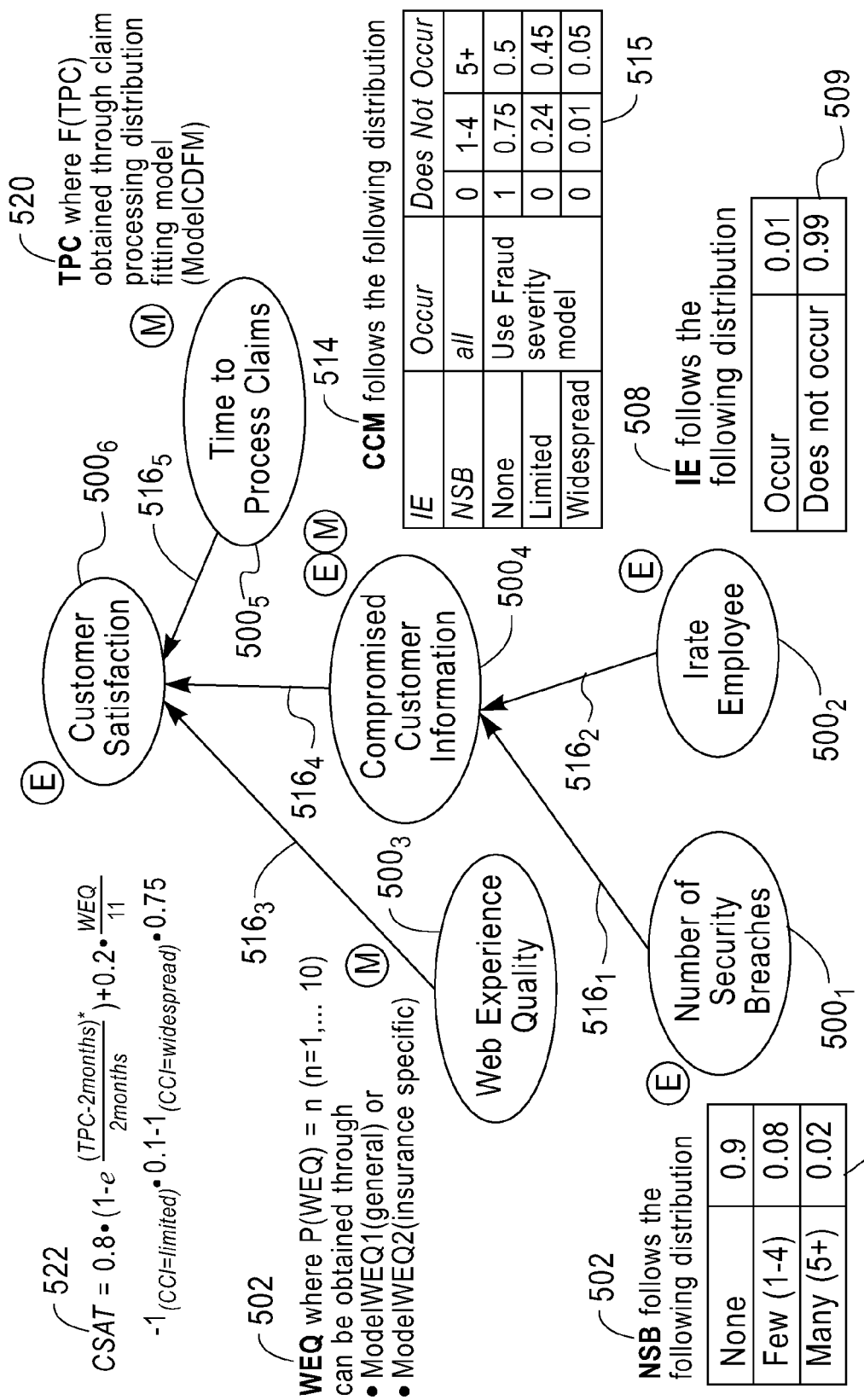
FIG. 5 is an example of a heterogeneous risk model composed by the present invention.

FIG. 1 is a flow diagram illustrating a method for building a probabilistic risk network. The method begins at block 102 and proceeds to block 104. At block 104, a risk node is annotated as elicited vs. non-elicited. As mentioned before, a risk node is a variable that enters in the aggregate risk model. An elicited risk node is totally dependent upon expert (human) opinion for evaluation. As an example, an expert may evaluate the probability of a security breach at an insurance company. The expert determines the probabilities that a security breach will never occur, will occur only a few times, or will occur many times. The probabilities associated with the occurrence of a security breach may be stored in a table. Such an example is shown in FIG. 5 as table 502. A non-elicited risk node is associated with a risk that can be can quantified or calculated by a mathematical model, and is dependent upon a variable risk input. The variable risk input may be deterministic or a probability distribution. Referring back to FIG. 1, at decision block 106, the method determines if a risk node is elicited. If the risk node is elicited, then the method proceeds to block 110. The method checks for the presence of any additional risk nodes at block 110. If more risk nodes are present, then the method loops back to block 104 and the next risk node is examined.

At block 106, if a risk node is deemed non-elicited, then the method proceeds to block 108. At block 108, a set of composite risk node extensions are specified. Composite risk node extensions comprise meta-data for each non-elicited risk node specifying additional characteristics of the node as well as selection and aggregation rules that govern how to select or aggregate the results in the event multiple risk models results have been returned by the risk analytics container module. A set of risk model selection and risk model aggregation rules is associated with the risk node at block 110. In one embodiment, the risk model selection rules are used to select an appropriate risk model based upon the risk input. For example, if the risk input comprises information about website experience, such as page views and the amount of time a person spends visiting a website, then a website experience quality risk model may be selected by the risk model selection rules. In another embodiment of the invention, the risk model selection rules may select multiple risk models. Risk model selection rules may depend upon the data sources accessed, analytical techniques used (such as Bayesian analysis), geographic location of the client requesting the risk analysis, data currency (temporal freshness of the data), speed of model operation and model output.

The risk network provides the structure of the variables that enters the aggregate risk model. The risk network combination rules govern how the outputs for each of the risk nodes are combined to obtain the requested risk quantification.

Endpoints are the inputs or the outputs of each risk model and are used to interconnect the risk models. As an example, consider a risk model that provides the probability of an earthquake occurring in a city for a given year. The probability distribution of an earthquake occurring is an endpoint of the risk model. The endpoint of the risk model can then be provided to another risk model, such as a facility fire risk model. Thus, the output of the earthquake risk model functions as the input of the facility fire risk model. Specification of endpoints (inputs and outputs) is essential to ensure that different risk models can be linked and aggregated together consistently.

For a given risk node, the outputs of different risk models may be combined equally, or in a weighted proportion. Referring again to the website experience example, consider two separate risk models identified as Web Experience Quality Model 1 (ModelWEQ1) and Web Experience Quality Model 2 (ModelWEQ2) (shown in FIGS. 4 and 5). ModelWEQ1 assesses distribution of web experience quality and can be calculated within seconds. ModelWEQ2 also assesses distribution of web experience quality and can be calculated within hours. Perhaps, ModelWEQ2 is more comprehensive and accurate than ModelWEQ1. The risk model aggregation rules determine how the outputs of ModelWEQ1 and ModelWEQ1 are combined. As shown in FIG. 5, the output of ModelWEQ2 is weighted greater than the output of ModelWEQ1 within the aggregation. Returning to FIG. 1, the method continues to block 110 and checks for the presence of any additional risk nodes as discussed above. The method ends at block 112.

Figure 2:
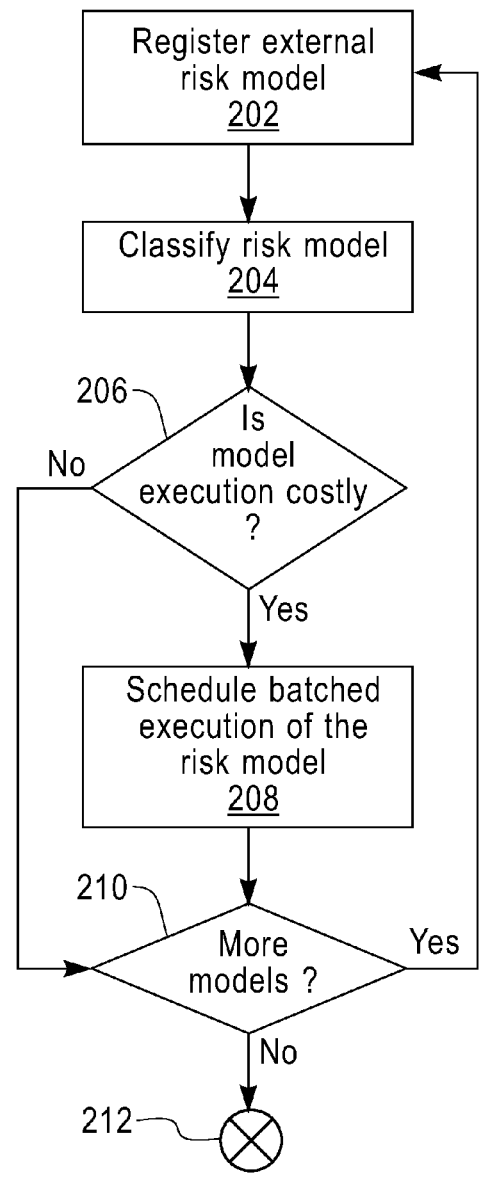
FIG. 2 is a flow diagram illustrating a method for building a library of risk models.

FIG. 2 is a flow diagram illustrating a method for building a library of risk models. An example of a risk model library is shown in FIG. 4. Referring to FIG. 2, the method begins at block 202. At block 202, a risk model is registered with a library of risk models. At block 204, the risk model is classified according to one or more categories within the library. As illustrated in FIG. 4, the risk model library includes, but is not limited to, categories such as an industry 406, an operation speed of the risk model 408, and a geographic location 410. Referring back to FIG. 2, at decision block 206, the operation cost of the risk model is classified. If the operation cost of the risk model exceeds a threshold level cost in terms of computation time then the method proceeds to block 208 and the risk model is classified as a model whose evaluation is governed by a scheduler. The scheduler may batch execute the risk model, or execute the risk model at a time when the operation cost does not exceed the threshold level. If, at 206, it is determined that the operation cost of the risk model does not exceed a threshold level, then the risk model is classified as being allowed to execute upon demand. The method checks for the presence of any additional risk models at block 210. If additional risk models are present, then the method loops back to block 202 where blocks 206, 208 and 210 are repeated. The method ends at block 212.

Figure 3:
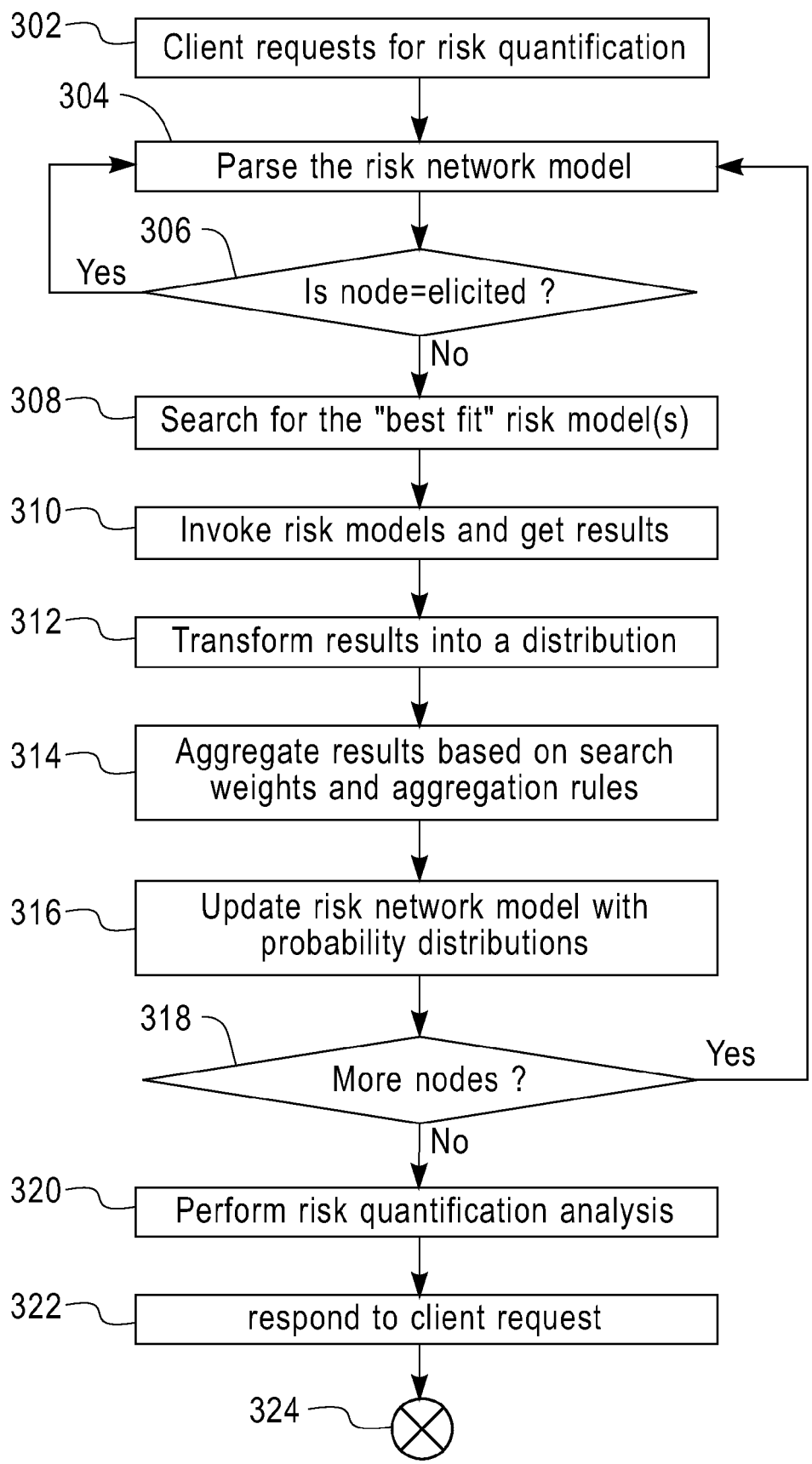
FIG. 3 is a flow diagram illustrating a method for quantifying risk using a dynamically composed risk model.

FIG. 3 is a flow diagram illustrating a method for quantifying risk using a dynamically composed risk model. The method begins at block 302 when a client via a locally or externally attached device, requests risk quantification given certain data input. At block 304, the risk network model is parsed to determine the structure of the risk network model. Parsing may include determining the number of risk nodes in the risk network model and the number of arcs required to traverse the risk network model. At decision block 306, the risk node is examined to determine if the node is elicited or non-elicited. As discussed above, an elicited risk node is not quantified by a mathematical model. If the risk node is elicited, then the method returns to block 304. If the risk node is not elicited, then the method proceeds to block 308.

At block 308, the method searches the risk model library 400 (shown in FIG. 4) for a risk model 412 that "best fits" the risk node. In one embodiment, the best fit may be determined by using the risk model selection rules to match the risk node to one or more categories associated with a risk model 412 in the risk model library 400. For example, a request for risk quantification analysis of a supply chain would cause selection of the BSCRAM risk model $412_1$. In another embodiment, the risk node may also be matched with multiple risk models 412 within the risk model library. At block 310, the best fit risk model 412 selected by the risk model selection rules is operated and a result is calculated. The results of the calculation are transformed into a probability distribution at block 312. For example, the transformation can be performed running a Monte-Carlo analysis of the model, or if the output of the model is a continuous probability distribution, by discretizing the output into a discrete probability distribution.

At block 314, the distributed results of the risk model calculation are aggregated together with other risk model calculations. Aggregation of data is possible because the output of each risk model is in a consistent form, such as a probabilistic distribution with the same categories when discrete (Above USD40, Below USD40). The other risk model calculations may be from the same risk model, but calculated at a different time, or from a different risk model. The aggregation is based upon search weights and aggregation rules, such as Bayesian update rules. That is, the results of one risk model calculation may weigh more heavily than other risk model calculations within the models being aggregated. At block 316, the risk network model is updated with probability distributions. The aggregated risk network model may be updated with the aggregate probability distributions calculated at block 314, or the non-aggregated probability distributions calculated at block 312, for the case where only one model is selected as the result of running block 308. The method then checks for the presence of any additional risk nodes to be processed for that client at decision block 318. If additional risk nodes are present, then the method loops back to block 304. Otherwise, the method proceeds to block 320.

At block 320, a risk quantification analysis is performed. In one embodiment, the probability distributions of the non-elicited nodes are combined with the probability distributions of the elicited nodes. The analysis of the non-elicited nodes together with the elicited nodes is possible because each risk node is associated with a risk model that provides an output in a consistent form. Risk quantification provides a probability distribution of the variables of interest, which fully describes the risk and from which one can derive a variety of statistics to characterize it in a more compact and user friendly format, for instance, average value, variance, and value at risk. All or any of these statistics are reported to the client at block 322. The method ends at block 324.

As referred herein above, FIG. 4 is an example of a library 400 of risk models 412. The risk models 412 are each identified by a model name, such as BSCRAM $412_1$, ModelWEQ1 $412_2$, ModelWEQ2 $412_3$, etc. A list of attributes, including a description 404, an industry 406, an operation speed 408, and a geographic location 410, are associated with each risk model in the library. For example, the risk model ModelWEQ1 assesses distribution of web experience quality, is a general industry model, can be operated within seconds, and is a suitable global risk model. Other risk models within the library are only suitable to particular industries, such as the insurance industry, or suitable to particular countries. An appropriate risk model may be selected from the library by the method of FIG. 3 to quantify a risk.

FIG. 5 is an example of a risk network. The risk network comprises risk nodes 500. The risk nodes, $500_1$ to $500_6$, are directly or indirectly interconnected with each other by arcs 516, and each risk node 500 is associated with a set of possible risk models. Certain risk nodes, such as NSB $500_1$ and IE $500_2$ are elicited risk nodes, and are annotated with an E. Other risk nodes, such as WEQ $500_3$ are non-elicited risk nodes, and are annotated with an M. CCI Risk node $500_4$ is a combination of elicited and non-elicited risks nodes, and is annotated with an E and an M.

The customer satisfaction (CSAT) risk model 522 is associated with node $500_6$, the time to process claims (TPC) risk model 520 is associated with node $500_5$, the web experience quality (WEQ) risk model 518 is associated with node $500_3$, and the compromised customer information (CCI) risk model 514 is associated with node $500_4$. The number of security breaches (NSB) risk model 502 is associated with node $500_1$ and irate employees (IE) risk model 508 is associated with node $500_2$.

Elicited risk nodes pertain to risks that are best evaluated by an expert. In one embodiment, the results of the expert evaluation are stored in a table. As an example, the expert evaluation of NSB risk node $500_1$ is stored in table 503 and the expert evaluation of IE risk node $500_2$ is stored in table 509. In this example, both tables 503 and 509 store the results of the expert evaluation as a probabilistic distribution of a risk event. The consistent form of the data between the two tables 503 and 509 allows the data to be combined together by another risk model, such as CCI risk model 514. As shown in FIG. 5, the CCI risk model 514 aggregates the data stored in tables 503 and 509 to form a new table 515 of data concerning compromised customer information. This table 515 also stores the data as a probabilistic distribution of a risk event, thus maintaining consistency of the form of the data across the risk model network. In the example shown, the CCI risk model 514 is associated with a non-elicited risk node $500_4$. Thus, one would appreciate that elicited risk nodes can be evaluated together with non-elicited risk nodes by the present invention.

The outputs of each risk node in the network are capable of functioning as inputs to another risk node. In one embodiment, the outputs of each risk model are a probabilistic distribution of an occurrence of a risk event for each risk node. The form of the outputs is consistent across the composite risk model network, and each risk node that relies on a parent risk node is consistent with the parent risk node. For example, the CCI risk node 514 is consistent with the NSB risk node 502, because it only requires the knowledge of whether none, few or many security breaches have occurred and not a more granular description (such as whether one, two or three security breaches have occurred). This consistency allows the outputs of different risk models to be combined.

Referring again to FIG. 5, the outputs of the IE risk model 508 and the NSB risk model 502 function as the inputs to the CCI risk model 514; the outputs of the WEQ risk model 518, the CCI risk model 514, and the TPC risk model 520, all function as the inputs to the CSAT risk model 522. In one embodiment, the CSAT risk model 522 is calculated according to the risk model equation, which represents a deterministic combination of the other variables rather than a probabilistic one. The resulting customer satisfaction output is probabilistic because all of the inputs are probabilistic. In the present example, CSAT is calculated according to the following equation:

$$CSAT = 0.8 \times \left(1 - e^{-\frac{(TPC - 2months)^+}{2months}}\right) +$$
$$0.2 \times \frac{WEQ}{10} - 1_{\{CCI=limited\}} \times 0.1 - 1_{\{CCI=widespread\}} \times 0.75$$

Figure 6:
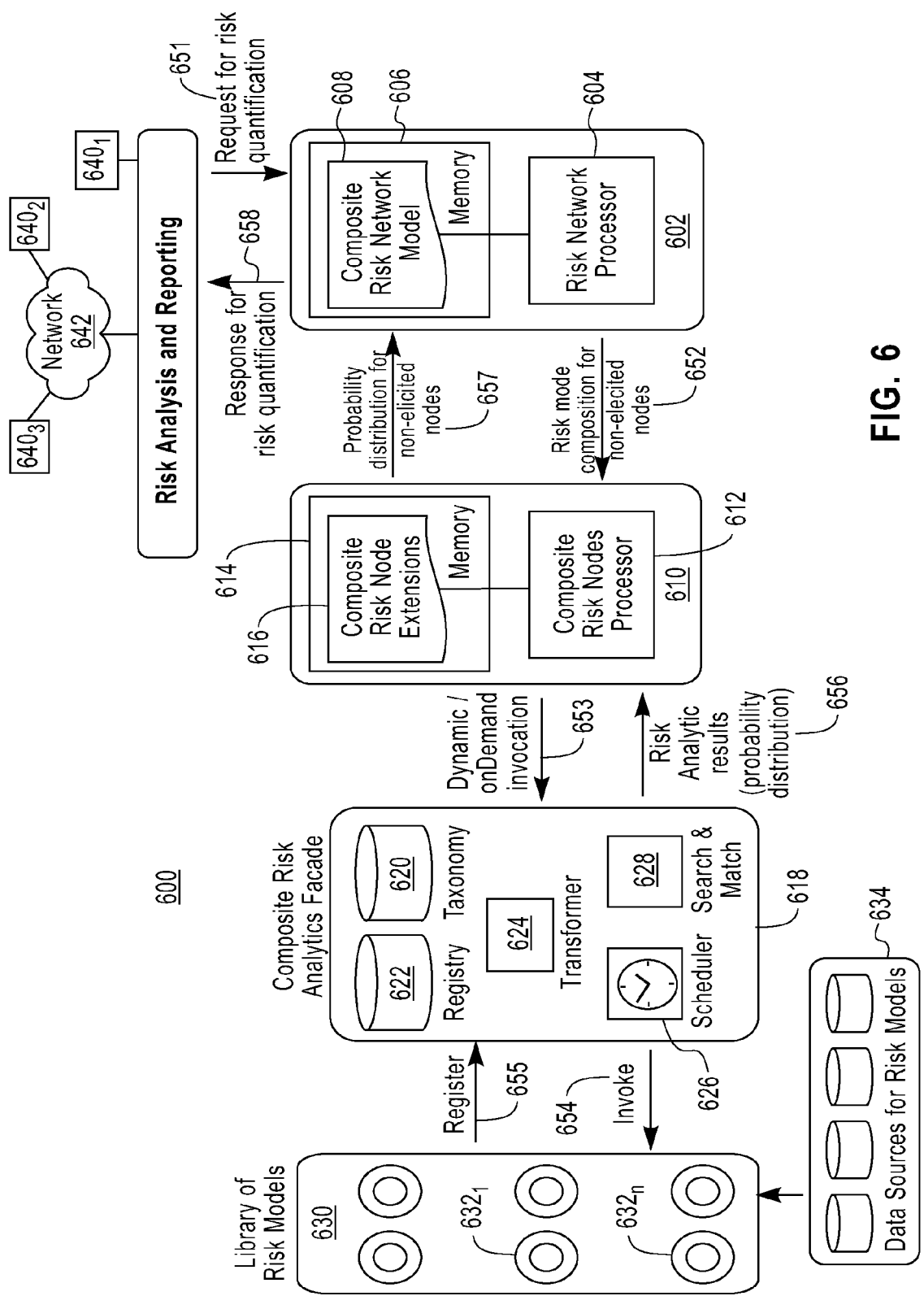
FIG. 6 is a block diagram of an architecture and computing environment for implementing the present invention.

FIG. 6 is a block diagram of an architecture and computing environment 600 for implementing the present invention. The architecture comprises client devices 640, a network 642, a risk network server 602, a composite risk node server 610, a composite risk analytics facade 618, a library of risk models 630, and data sources for the risk models 634. One would appreciate that the risk network server 602 and the composite risk node server 610 may be combined as one server (not shown) or exist across a plurality of servers (not shown).

The client devices 640 may be desktop computers, laptop computers, personal digital assistants, or any other device that may benefit from connection to a computer network. The client device 640 may be connected directly to the risk network server 602, or indirectly connected to the risk network server 602 via a network 642, such as the Internet or Ethernet.

The risk network server 602 comprises a risk network processor or central processing unit (CPU) 604, and a memory 606. The CPU 604 is interconnected to the memory 606 via support circuitry. The support circuitry includes cache, power supplies, clocks, input/output interface circuitry, and the like.

The memory 606 may include random access memory, read only memory, removable disk memory, flash memory, and carious combinations of these types of memory. The memory 606 is sometimes referred to as a main memory and may in part be used as cache memory. The memory 606 stores a composite risk network model 608. The server 602 is a general purpose computer system that becomes a specific purpose computer system when the CPU 604 executes the composite risk network model 608.

Similarly, the composite risk node server 610 comprises a risk network processor or central processing unit (CPU) 612, and a memory 614. The CPU 612 is interconnected to the memory 614 via support circuitry. The support circuitry includes cache, power supplies, clocks, input/output interface circuitry, and the like.

The memory 614 may include random access memory, read only memory, removable disk memory, flash memory, and carious combinations of these types of memory. The memory 614 is sometimes referred to as a main memory and may in part be used as cache memory. The memory 614 stores composite risk node extensions 616. Composite risk node extensions comprise meta-data for each non-elicited risk node specifying additional characteristics of the node as well as selection and aggregation rules that govern how to select or aggregate the results in the event multiple risk models results have been returned by the risk analytics container module. In one embodiment of the invention the characteristics include geographic location, data currency, speed of model operation required, industry or domain (such as weather or web experience).

The library of risk models 630 comprises individual risk models $632_1$ to $632_n$. The composite risk analytics container 618 comprises a taxonomy module 620, a registry module 622, a transformer module 624, a scheduler module 626, and a "search and match" module 628. The registry 622 maintains a list of individual risk models 632 in the library 630 with at least one parameter for invocation and an endpoint. The taxonomy 620 comprises a list of one or more attributes, such as data sources accessed, analytical techniques used, geographic location, data currency, speed of model operation and model output for each risk model 632. The transformer 624 discretizes the output results of a risk model 632. Discretization transforms the risk model 632 into a discrete counterpart suitable for numerical evaluation by the composite risk node server 610. The scheduler 626 schedules operation (evaluation) of a selected risk model 632. If the cost of executing the risk model is high, then the scheduler batch schedules operation of the risk model. The "search and match" 628 matches risk input data provided within the composite risk node extensions to a suitable risk model 632 for evaluation by the composite risk node server 610.

The architecture 600 enables the method for quantifying risk using a dynamically composed risk model to be deployed on an organization wide basis. In one embodiment of the invention, a risk analysis request 651 is made to the risk network server 602 by the client device 640. The risk network processor 604 parses the composite risk network model 608 to determine if one or more risk nodes are non-elicited risk nodes, and passes the risk input data for the non-elicited risk nodes 652 to the composite risk node server 610. The composite risk node server 610 invokes 653 the composite risk analytics facade 618 to select one or more risk models 632 from the library 630. The risk models 632 are selected from the library 630 by the "search and match" 628 of the facade 618. The "search and match" 628 utilizes the registry 622 and the taxonomy 620 to select 654 an appropriate risk model 632 according to a set of risk model selection rules by comparing the composite risk node extensions for the non-elicited risk node with the inputs and characteristics of the risk models registered in the risk container. Risk models are registered into the container through a registration process wherein the models and its endpoints (invocation parameters), inputs and characteristics are recorded in a registry. One embodiment of the registry is a web service registry utilizing Universal Description Discovery and Integration (UDDI) as the means for registering the services that can be discovered and dynamically integrated.

If necessary, the transformer 624 discretizes the output results of the selected risk models 632. In one embodiment, the results are passed back 656 to the composite risk node server 610 as a probabilistic distribution. The probabilistic distribution is passed 657 from the composite risk node server 610 to the risk network server 602. In one embodiment, the risk network server 602 forms a composite risk network model 608 by aggregating the probabilistic distributions of the non-elicited risk nodes with the probabilistic distributions of the elicited risk nodes. In this manner, a heterogeneous risk models is dynamically composed.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software; micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction operation system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction operation system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIGS. 1 through 6. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be operated substantially concurrently, or the blocks may sometimes be operated in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A computer implemented method for composing an aggregate risk model representing an operational risk of an organization, said model comprising:

receiving, at a programmed processor unit, a risk quantification request including risk input data associated with a plurality of risk nodes from a user input device, said plurality of risk nodes including non-elicited risk nodes invoking a mathematical model that quantifies a risk, and elicited risk nodes that quantify risk by human expert evaluation;

dynamically building responsive to said request, via said programmed processor unit, a probabilistic risk network model of interconnected nodes representing an interdependence of risk factors associated with operational risk of an organization and having one or more associated risk models;

running one or more risk models at each risk node to output individual risk quantifications for each risk node; wherein for each risk node of said network having multiple associated risk models:

searching a library of risk models for the one or more risk models that fit the risk input data;

selecting, based on a risk model selection rule, the one or more risk models that fit the risk input data from the library of risk models, the risk model selection rule based on factors including: data sources accessed, a geographic location of a risk quantification requestor, a temporal freshness of the data, and a speed of model operation and the model output;

running said one or more risk models to output respective individual risk quantifications for that node; and when multiple risk models are run, aggregating the individual risk quantification outputs of the selected risk models into a single output of said risk node; and combining the single output of said risk node with a model output of another risk node to provide an aggregate risk model, wherein said programmed processor unit executes said dynamically providing, running, searching, selecting, running, aggregating and combining steps.

2. The computer implemented method of claim 1, wherein the step of aggregating further comprises aggregating the risk quantification outputs of the selected risk models based upon an aggregation rule.

3. The computer implemented method of claim 1, wherein the step of aggregating further comprises aggregating the individual risk quantifications based upon Bayes rule.

4. The computer implemented method of claim 1, further comprising transforming the individual risk quantifications into a consistent form of results, wherein the consistent form of results is a probabilistic distribution.

5. The computer implemented method of claim 1, wherein the step of running the one or more risk models at each risk node is dependent on computational requirements of an individual risk model.

6. The computer implemented method of claim 5, wherein the computational requirements of the individual risk model exceed a threshold and the individual risk model is batch operated.

7. The computer implemented method of claim 2, wherein said aggregation rule specifies combining risk quantification outputs for different risk models equally, or in a weighted proportion.

8. The computer implemented method of claim 1, wherein said library of risk models includes a registry of risk models, each risk model associated with one or more invocation parameters and registered endpoints representing inputs and outputs.

9. A computer program product for composing an aggregate risk model representing an operational risk of an organization, comprising:

a storage medium readable by a processor, the storage medium not a propagating signal, and storing instructions for operation by the processor for performing a method comprising:

receiving, at a programmed processor unit, a risk quantification request including risk input data associated with a plurality of risk nodes from a user input device, said plurality of risk nodes including non-elicited risk nodes invoking a mathematical model that quantifies a risk, and elicited risk nodes that quantify risk by human expert evaluation;

dynamically building responsive to said request, via said programmed processor unit, a probabilistic risk network model of interconnected nodes representing an interdependence of risk factors associated with operational risk of an organization and having one or more associated risk models;

running one or more risk models at each risk node to output individual risk quantifications for each risk node; wherein for each risk node of said network having multiple associated risk models:

searching a library of risk models for the one or more risk models that fit the risk input data;

selecting, based on a risk model selection rule, the one or more risk models that fit the risk input data from the library of risk models, the risk model selection rule based on factors including one or more of: data sources accessed, a geographic location of a risk quantification requestor, a temporal freshness of the data, and a speed of model operation and the model output;

running said one or more risk models to output respective individual risk quantifications for that node; and when multiple risk models are run, aggregating the individual risk quantification outputs of the selected risk models into a single output of said risk node; and combining the single output of said risk node with a model output of another risk node to provide an aggregate risk model.

10. The computer program product for composing the aggregate risk model of claim 9, wherein the step of aggregating further comprises aggregating the risk quantification outputs of the selected risk models based upon an aggregation rule.

11. The computer program product for composing the aggregate risk model of claim 9, wherein the step of aggregating further comprises aggregating the individual risk quantifications based upon Bayes rule.

12. The computer program product for composing the aggregate risk model of claim 9, the computer program product further comprising:

transforming the individual risk quantifications into a consistent form of results, wherein the consistent form of results is a probabilistic distribution.

13. The computer program product for composing the aggregate risk model of claim 9, wherein the step of running the one or more risk models at each risk node is dependent on computational requirements of an individual risk model.

14. The computer program product for composing the aggregate risk model of claim 13, wherein the computational requirements of the individual risk model exceed a threshold and the individual risk model is batch operated.

15. A system for composing a heterogeneous risk model, the system comprising:

a memory device;

a processor unit operatively coupled to said memory storage device, said processor unit configured to run instructions stored in said memory device to perform a method to:

receive a risk quantification request including risk input data associated with a plurality of risk nodes from a user input device, said plurality of risk nodes including non-elicited risk nodes invoking a mathematical model that quantifies a risk, and elicited risk nodes that quantify risk by human expert evaluation;

dynamically build responsive to said request a probabilistic risk network model of interconnected nodes representing an interdependence of risk factors associated with operational risk of an organization, a risk factor and having one or more associated risk models;

running one or more risk models at each risk node to output individual risk quantifications for each risk node; wherein for each risk node of said network having multiple associated risk models, the processor unit further configured to:
search a library of risk models for the one or more risk models that fit the risk input data;
select, based on a risk model selection rule, the one or more risk models that fit the risk input data from the library of risk models, the risk model selection rule based on factors including one or more of: the data sources accessed, a geographic location of a risk quantification requestor, a temporal freshness of the data, and a speed of model operation and the model output;
run said one or more risk models to output respective individual risk quantifications for that node; and
when multiple risk models are run, aggregate the individual risk quantification outputs of the selected risk models into a single output of said risk node; and
combine the single output of said risk node with a model output of another risk node to provide an aggregate risk model.

16. The system of claim 15, wherein the processor unit is further operable to transform the individual risk quantifications outputs into a consistent form of results, wherein the consistent form of results is a probabilistic distribution.

17. The system of claim 15, wherein the processor unit aggregates the individual risk quantifications based upon Bayes rule.

18. The system of claim 15, wherein running the one or more risk models is dependent on computational requirements of the individual risk model.

19. The system of claim 18, wherein the computational requirements of the individual risk model exceed a threshold and the individual risk model is batch operated by the processor unit.

20. The system of claim 15, wherein aggregating risk quantification outputs for different risk models may be combined equally or in a weighted proportion based upon an aggregation rule.

21. The system of claim 15, wherein said library of risk models includes a registry of risk models, each risk model associated with one or more invocation parameters and registered endpoints representing inputs and outputs.

* * * * *